3,407,104
FABRIC BONDING PROCESS
Eugene L. Crandall, 2530 By Pass Road,
Elkhart, Ind. 46514
No Drawing. Filed Mar. 7, 1963, Ser. No. 263,414
5 Claims. (Cl. 156—212)

This invention relates to a new and improved bonding process. Particularly the invention relates to a process for bonding a fabric material, preferably of the plastic family, to a contoured article wherein a padding material is interposed between said fabric and the contoured article. More particularly, the invention relates to a process wherein a contoured article, such as a contour chair or the like, may be covered with a padding or cushioning material and a plastic fabric superimposed and bonded to the contoured article in a simple and efficient operation which results in an integral construction without seams or wrinkles on the surface thereof.

Generally speaking, the process of this invention comprises the following steps:

(1) Padding or cushioning material which has been precut to the size and shape of the article to which it is to be applied is coated on the reverse side thereof with a suitable adhesive. The upper side of the contoured article is then coated with the same or similar and compatible adhesive. The coated padding is then placed, uncoated side down, in a mold that conforms substantially exactly to the size and contour of the article, the adhesive coated article is placed over the padding, and pressure is applied forcing the article into intimate and complete contact with the padding. When the adhesive is cured, or set, the pressure is released and the article with the padding adhering thereto is removed from the press or mold.

(2) A sheet of artificial leather, or other fabric material, preferably one of a plastic nature, which has been cut to a size which conforms to the size and shape of the padded contoured article is coated with adhesive on the unfinished or back side, and placed, finished side down, in a vacuum mold. This mold conforms substantially to the size and shape of the contoured article. The edges of the fabric sheet are secured around the sides of the mold by a holding means which will permit some slippage at points of greatest tension, and yet which prohibits the passage of air at any point. A vacuum is then applied to the mold and the air is exhausted from the pocket formed by the fabric material and the mold and atmospheric air pressure causes the fabric to conform exactly to the mold surface. The padded contoured article is then placed in the mold so that the contours match and heat is applied by a heating means so that the entire article, padding, and fabric is raised to the same temperature.

(3) Pressure by mechanical means is then applied to the contoured article so that intimate and complete contact is obtained between the padding and the fabric material and the padding is compressed to a slight degree. This pressure is maintained until the adhesive is set and then the temperature is decreased. After a suitable curing period at room temperature, the pressure is released and the article removed from the mold.

(4) The excess fabric material is then trimmed from the sheet, the edges are secured around the back or reverse edge of the article and fastened in place by any suitable means, such as with adhesive. If desired, a finishing strip may also be glued in place to cover the material edges.

The process of this invention may be applied to any contoured article which is capable of being fitted into an appropriate mold. The construction materials of which the article is fabricated may also be chosen from a wide range of materials. For example, the contoured article may be made of metal, wood, fiber glass, pressed board, molded paper pulp, laminated materials such as laminated wood or glass, and the like. The main requirement of the contoured article is, of course, that of strength, and the type of material chosen should possess the requisite stress resistance to meet the needs of the finished product.

The padding material which is used to furnish softness and comfort to the finished product, such as a chair or other seating device, may be selected from any of the foam elastomers or foam cellular materials with which the art is familiar. Preferably the padding is a resilient material which readily regains its shape after being deformed by pressure. Foam rubber, foamed plastics, polyethylene foam, polyurethane foam, foamed polyvinyl ethers, foamed polyesters, foamed polyesteramides, foamed polyisocyanates, etc., may be used in the process of this invention.

The covering which is used in the preferred embodiment of the inventive concept may be selected from the wide range of thermoplastic materials which are now commercially available. Materials such as polyvinyl fabrics, cellulose acetate butyrate fabrics, polyvinyl chloride fabrics, vinyl copolymeric fabrics, such as copolymers of vinyl chloride and vinyl acetate, the well-known ABS fabrics which are technically copolymers of acrylonitrile-butadiene-styrene, may be used as the covering of the contoured articles. Preferably the covering is a thermoplastic material of from 10 to 40 mils thickness but other fabrics may be used in the process of this invention. Any material which is impervious to air and capable of being stretched and made air impervious to permit vacuum drawing, may be used. Leather, either artificial or natural, may be used. Woven fabrics backed by an air impervious material, such as a sheet of plastic, may also be used in the process of this invention.

In the practice of the new and unique process of this invention it has been found that the variables of temperature, humidity, and time are critical for the most efficient performance of the process. These variables must be carefully controlled within rather narrow limits for most successful operation of the inventive steps. These variables, their interdependence, and their criticality will be discussed in detail in connection with the various steps of the process.

PREPARATION OF THE CONTOURED ARTICLE AND PADDING MATERIAL

The article to be subjected to the inventive process is first coated on the top side thereof with an adhesive. Preferably this adhesive is synthetic rubber based and is formulated with the proper solvent vehicle to permit optimum setting times. Neoprene based adhesives are preferable in the practice of this invention and preferably are extended with ketone solvents, such as acetone, methyl ethyl ketone, methyl isobutyl ketone, and the like. Using a neoprene-based ketone extended adhesive, it has been found that a solids-to-solvent ratio of about 1:4 to 1:3 is operable.

The humidity and air temperature in the area of adhesive application must also be carefully controlled for satisfactory operation of the process. As the humidity increases, the ambient temperature must also be correspondingly increased. The relationship between humidity and temperature is set out, generally, in the following table.

*Table I*

| Rel. hum. (percent): | Temp. (° F.) |
|---|---|
| 90 | 85 |
| 80 | 82 |
| 70 | 79 |
| 60 | 76 |
| 50 | 73 |
| 40 | 70 |
| 30 | 69 |
| 20 | 66 |

The padding material, which has been previously cut to conform to the size of the contoured article, is also coated with the same adhesive as described above, and the relative conditions of temperature and humidity given in Table I apply to this adhesive application as well. The padding is then placed on the contoured article in such fashion that the coated surfaces contact with each other. A metal form which is substantially identical in size and shape to the contoured article is used to insure complete contact, under pressure, of the adhesive coated padding and article. The contoured article, with the padding material attached, is so positioned on the form that the padding is between the form and the contoured article. Pressure sufficient to compress the padding slightly is applied to the reverse side of the contoured article and is maintained until the adhesive is sufficiently set so as to bond the padding to the contoured article. This will ordinarily take between 10 and 20 minutes using from 30 to 50 pounds per square inch pressure.

The thickness and density of the padding material selected will depend partly upon the fabric used as the covering material and partly upon the amount of resiliency or support that is desired. When using a polyurethane foam as a padding material and a 15 mil polyvinyl fabric commercially known as "Naugahyde," a thickness of padding of about 1 to 5 inches of a material having a density, or weight per yard, of 20 to 38 ounces is preferably used.

APPLICATION OF FABRIC TO PADDED ARTICLE

When the bond between the padding material and the contoured article is complete, the step of fabric application is performed. A mold which corresponds substantially exactly to the contoured article is used in this step. This mold contains a plurality of small holes which are interconnected to a manifold system adapted to be connected to a source of vacuum. The fabric to be applied, having its underside coated with the same adhesive as described above, is placed face side down over the vacuum mold and held in place with controlled tension supplied by a fastening device, such as a ring slightly larger than the mold, or other device familiar to those skilled in the art. Vacuum is applied to the mold and the fabric is pressed down by external air pressure into the mold, adapting itself snugly to the mold contours. The padded article is then positioned on the mold so that the contours match, and pressure is applied. Pressure in the order of magnitude of about one-half to one pound per square inch is preferable.

Immediately prior to the application of pressure the article, padding, and covering fabric is subjected to increased temperature by any convenient heating means. Preferably a heat trap, an open-bottomed box lined with a reflecting material and equipped with radiant heating elements such as filaments or lamps, is lowered over the vacuum form and its contents so that all portions of the fabric, padding, and contoured article are elevated to an equivalent temperature.

The temperature used in this vacuum forming, or vacuum drawing process step, will depend upon the fabric material, the padding type and density, the relative humidity, the adhesive formulation, and the pressure being applied. Using a polyvinyl fabric, a polyurethane foam of from one-half to five inches in thickness, and a neoprene-based adhesive with a ketone solvent-to-solids ratio of about 4:1, the temperature of this step will vary with the relative humidity in accordance with the following:

*Table II*

| Rel. hum. (percent): | Temp. (° F.) |
|---|---|
| 100 | 140 |
| 90 | 139 |
| 80 | 138 |
| 70 | 137 |
| 60 | 136 |
| 50 | 135 |
| 40 | 134 |
| 30 | 133 |
| 20 | 132 |

When the fabric-padding bond is completed, which ordinarily takes between about 10 to 20 minutes, the temperature is reduced to room temperature and the vacuum is released. Edges of the fabric which extend beyond the edges of the contoured article are folded over to the reverse side thereof, trimmed to the size desired and may be glued, or otherwise bonded to the reverse side of the article.

To summarize briefly, this invention relates to a new and unique fabric bonding process which comprises the steps of vacuum drawing an adhesive coated thermoplastic material in a contoured mold, and applying an adhesive coated padded contoured article to said vacuum-drawn thermoplastic until bonded thereto. More particularly, the invention comprises the steps of applying adhesive to a padding and to a contoured article, maintaining an intimate contact between said adhesive coated padding and article in said contoured mold so that intimate and continuous contact is maintained for the desired period of time, and thereafter applying said padded contoured article to an adhesive coated thermoplastic material which has been drawn to the exact contour of the article in a vacuum mold. Conditions of temperature and humidity must be carefully controlled for best results, and the solids-to-solvent ratio of the adhesive used must be carefully regulated. For optimum results a solids-to-solvent ratio of a neoprene-based adhesive with a ketone solvent such as acetone should be within the range of from 1:3 to 1:4. Adhesive application should be accomplished under conditions such that when the relative humidity is between 50% to 90%, the temperature is controlled between 73° F. and 85° F., and in direct proportion to these range limits.

It will be apparent to those skilled in the art that apart from the critical limitations above stated, variations in the process may be made and it is intended that the appended claims be limiting to the inventive concept only insofar as those familiar with the art would so interpret.

What is claimed is:

1. A fabric bonding process which comprises the steps of coating one surface of a contoured article with a neoprene based adhesive, coating one surface of a resilient padding material which conforms to the size and shape of said contoured article with said adhesive, contacting said coated surface of the resilient material with said coated surface of the contoured article in a pressure mold under controlled conditions of humidity and temperature until said adhesive is set, coating one surface of a thermoplastic fabric with said adhesive, vacuum drawing said coated thermoplastic fabric in a vacuum mold that conforms to said contoured article, contacting said coated surface of drawn fabric with said padded contoured article under controlled conditions of humidity and temperature until said adhesive is set, and removing said thermoplastic fabric covered padded contoured article from said vacuum mold.

2. A process for fabric bonding which comprises coating one surface of a contoured article with a neoprene-based adhesive which has been extended with a solvent compatible therewith, coating one surface of a foam elastomer padding with said adhesive, contacting said adhesive coated sides of said foam elastomer and said contoured article in a pressure mold, controlling the conditions of humidity and temperature so that when the humidity is in the range of about 50% to 90% the temperature is maintained in direct proportion in the range of about 73° F. to 85° F., coating one surface of a thermoplastic material with said adhesive, vacuum drawing said thermoplastic material in a contoured vacuum mold, contacting said padded article to the adhesive coated surface of said thermoplastic material in said vacuum mold under pressure, regulating the humidity and temperature conditions such that when the humidity varies in the range of about 40% to 100% the temperature is maintained at 134° F. to 140° F. in direct proportion, maintaining said contact until said adhesive is set, and removing said thermoplastic coated padded contoured article from said mold.

3. A process for fabric bonding which comprises coating one surface of a contoured article made from a material selected from the class consisting of metal, wood, molded paper pulp, and fiber glass with a neoprene based adhesive which has been extended with a ketone solvent to a solids-to-solvent ratio of from 1:3 to 1:4, coating one surface of a resilient cellular padding material with said adhesive, contacting the coated surfaces of said resilient material and said contoured article in a pressure mold that conforms to the size and shape of said contoured article for a period of time sufficient to set said adhesive and under controlled conditions of temperature and humidity, coating one surface of a thermoplastic material selected from the group consisting of polyvinyl fabric, cellulose acetate butyrate fabric, polyvinyl chloride fabric, copolymeric vinyl chloride, vinyl acetate fabric, and copolymeric acrylonitrile-butadiene-styrene fabric with said adhesive, vacuum drawing said coated thermoplastic fabric in a vacuum mold corresponding substantially exactly to said contoured article, contacting said padded contoured article and the coated surfaces of said fabric under pressure and controlled conditions of temperature and pressure until said adhesive is set, and removing said thermoplastic fabric coated padded contoured article from said mold.

4. A process for fabric bonding which comprises coating one surface of a contoured article with a neoprene based adhesive which has been extended with a ketone solvent to a solids-to-solvent ratio of from about 1:3 to 1:4, coating one surface of a polyurethane foam padding material which has been previously cut to conform to the size and shape of said contoured article with said adhesive, intimately contacting under pressure said adhesive coated sides of said foam and said article in a pressure mold that is contoured substantially exactly to said contoured article, controlling the conditions of humidity and temperature so that when the humidity is in the range of about 50% to 90% the temperature is maintained in direct proportion in the range of about 73° F. to 85° F., coating one surface of a polyvinyl fabric with said adhesive, vacuum drawing said coated fabric in a contoured vacuum mold which corresponds substantially exactly to said contoured article, placing said padded contoured article over said vacuum drawn fabric so that intimate contact is maintained between said padding and the coated surface of said fabric, applying pressure to said article so as to slightly compress said padding, regulating the humidity and temperature conditions such that when the humidity varies from about 40% to 100% the temperature is maintained in the range of about 134° F. to 140° F. in direct proportion, maintaining said contact until said adhesive is set, and removing said padded fabric coated article from said mold.

5. A processs for fabric bonding which comprises coating one surface of a contoured fiberglass article with a neoprene-based adhesive which has been extended with acetone to a solids-to-solvent ratio of from 1:4 to 1:3, coating one surface of a polyurethane foam padding material of about 1 to 5 inches in thickness and a density of from 20 to 38 ounces per square yard which has been previously cut to conform to the size and shape of said contoured article, with said adhesive, intimately contacting under pressure of from 30 to 50 pounds per square inch said adhesive coated surfaces of said padding and said contoured article in a pressure mold that conforms substantially exactly to said contoured article for from 10 to 20 minutes under controlled conditions of temperature and humidity such that when the humidity varies from about 50% to 90% the temperature is maintained in direct proportion in the range of about 73° F. to 85° F., coating one surface of a polyvinyl fabric having a thickness of from about 10 to about 40 mils with said adhesive, vacuum drawing said coated fabric in a contoured vacuum mold which corresponds substantially exactly to the size and shape of said contoured article, placing said padded contoured article over said vacuum drawn fabric so that intimate contact is maintained between said padding and said adhesive coated surface of said fabric, applying from about ½ to about 1 pound per square inch pressure to said article, regulating the humidity and temperature conditions such that when the humidity varies from about 40% to 100% the temperature is maintained in the range of about 134° F. to 140° F. in direct proportion, maintaining said intimate contact for from 10 to 20 minutes, adjusting the temperature to room temperature, releasing said vacuum and said pressure, and removing said fabric coated padded contoured article from said vacuum mold.

References Cited
UNITED STATES PATENTS 3,054,714   9/1962   Johnston     156—212

ROBERT F. BURNETT, *Primary Examiner.*

W. J. VAN BALEN, *Assistant Examiner.*